United States Patent
Ozawa et al.

(10) Patent No.: US 6,924,018 B2
(45) Date of Patent: Aug. 2, 2005

(54) OPTICAL INFORMATION RECORDING MEDIUM

(75) Inventors: Takako Ozawa, Kanagawa (JP); Takeshi Kakuta, Kanagawa (JP); Toshio Ishida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 460 days.

(21) Appl. No.: 10/267,774

(22) Filed: Oct. 10, 2002

(65) Prior Publication Data

US 2003/0090990 A1 May 15, 2003

(30) Foreign Application Priority Data

Oct. 12, 2001 (JP) ........................................ 2001-315962
Mar. 14, 2002 (JP) ........................................ 2002-069578

(51) Int. Cl.$^7$ ................................................ B32B 3/02
(52) U.S. Cl. .................... 428/64.1; 428/64.4; 428/64.8; 430/270.14; 369/275.4
(58) Field of Search ............................ 428/64.1, 64.4, 428/64.8, 913; 430/270.14, 495.1, 945; 369/275.4

(56) References Cited

U.S. PATENT DOCUMENTS 6,246,656 B1 * 6/2001 Kawakubo et al. .... 369/112.23
6,699,591 B2 * 3/2004 Ishida et al. ................. 428/641
6,731,592 B2 * 5/2004 Usami ......................... 369/286
6,808,782 B2 * 10/2004 Usami et al. .............. 428/64.1
6,815,030 B2 * 11/2004 Ishida et al. ............... 428/64.1
2003/0137921 A1 * 7/2003 Higuchi .................... 369/275.4
2003/0183511 A1 * 10/2003 Kakuta et al. ......... 204/192.27
2004/0110087 A1 * 6/2004 Ozawa et al. .......... 430/270.13

FOREIGN PATENT DOCUMENTS

| JP | 10-320859 A | 12/1998 |
| JP | 2000-11453 A | 1/2000 |
| JP | 2000-306270 | 11/2000 |
| JP | 2001-118286 A | 4/2001 |
| JP | 2001-216686 A | 8/2001 |

* cited by examiner

*Primary Examiner*—Elizabeth Mulvaney
(74) *Attorney, Agent, or Firm*—Sughrue Mion, PLLC

(57) ABSTRACT

The present invention provides an optical information recording medium including a substrate having a groove that has a track pitch of 200 to 400 nm and a depth of 20 to 150 nm, the substrate having successively disposed thereon a light-reflective layer, a recording layer on which information is recordable by a laser beam having a wavelength of 450 nm or less, an adhesive layer containing an adhesive, and a cover layer having a thickness of 0.01 to 0.5 mm, wherein a surface of the light-reflective layer at a side thereof at which the recording layer is disposed has a ten-point average roughness Rz of 70 nm or less, a central surface average roughness SRa of 30 nm or less, and an average projection diameter Dv, at a height of 15 nm from a reference plane, of 75 nm or less.

20 Claims, No Drawings

OPTICAL INFORMATION RECORDING MEDIUM

BACKGROUND OF THE INVENTION

1. Field of the Invention

The present invention relates to an optical information recording medium, and more specifically to an optical information recording medium that is writable only once by heat mode.

2. Description of the Related Art

With increases in information processing throughput, there is also a strong demand for improvement in recording capacity in the field of optical information recording. A recording pit has been conventionally formed using a light beam having a recording wavelength of 635 nm. However, even higher density is demanded since the start of HDTV (High Definition Television) BS digital broadcasting is near at hand. In particular, an optical disk system that uses a blue-violet laser having a wavelength shorter than 635 nm and a high NA pick-up has been developed and researched, and in ISOM 2000 a DVR-Blue, which uses a blue-violet laser in a phase transition medium, has been developed.

However, there are problems in that when extremely small recording pits are formed using a light beam having a short wavelength, the size and shape of the recording pits formed are irregular, resulting in lowered performance with respect to jitter and noise.

Further, since the DVR-Blue utilizes high NA recording, a distance from a cover layer to a reflective layer is small, whereby if the surface of a reflective layer is rough or if the proportion of relatively high projections in an entire area is high, readability of recording marks is affected, resulting in lowered performance with respect to jitter, noise and the like.

SUMMARY OF THE INVENTION

The present invention has been accomplished in order to solve the above-described problems. That is, an object of the invention is to provide an optical information recording medium that is excellent in jitter, noise and the like and has high reliability.

Having conducted extensive research, the present inventors found that the optical information recording medium described below can solve the aforementioned problems, and thereby achieved the present invention.

According to the present invention, there is provided an optical information recording medium comprising a substrate including a groove that has a track pitch of 200 to 400 nm and a depth of 20 to 150 nm, the substrate having successively disposed thereon a light-reflective layer, a recording layer on which information is recordable by a laser beam having a wavelength of 450 nm or less, an adhesive layer containing an adhesive, and a cover layer having a thickness of 0.01 to 0.5 mm, wherein a surface of the light-reflective layer at a side thereof at which the recording layer is disposed has a ten-point average roughness Rz of 70 nm or less, a central surface average roughness SRa of 30 nm or less, and an average projection diameter Dv, at a height of 15 nm from a reference plane, of 75 nm or less.

DESCRIPTION OF THE PREFERRED EMBODIMENTS

An optical information recording medium according to the invention comprises a substrate including a groove that has a track pitch of 200 to 400 nm and a depth of 20 to 150 nm, the substrate having successively disposed thereon a light-reflective layer, a recording layer on which information is recordable by a laser beam having a wavelength of 450 nm or less, an adhesive layer containing an adhesive, and a cover layer having a thickness of 0.01 to 0.5 mm, wherein a surface of the light-reflective layer at a side thereof at which the recording layer is disposed has a ten-point average roughness Rz of 70 nm or less, a central surface average roughness SRa of 30 nm or less, and an average projection diameter Dv, at a height of 15 nm from a reference plane (hereinafter occasionally referred to simply as "at a height of 15 nm"), of 75 nm or less.

As used herein, the ten-point average roughness Rz, the central surface average roughness SRa and the average projection diameter Dv at a height of 15 nm are values measured after the cover layer has been peeled off and the recording layer has been subsequently eliminated using an alcohol-based solvent.

In the invention, the average projection diameter Dv refers to an average value of the diameters of circles represented by cross sections of protruded matter. The reference plane as used herein refers to a plane at a height of average value $Z_0$ in the direction of a Z axis when measured by an atomic force microscope (AFM). In other words, when the average value of Z data is $Z_0$, this plane is represented by an equation of $Z=Z_0$, i.e., a plane that is parallel to an XY plane.

Substrate

Materials conventionally used for optical information recording media substrate can be arbitrarily selected and used as the material for the substrate of the invention.

Specific examples of such substrate materials include glass, polycarbonate, acrylic resins such as polymethyl methacrylate, vinyl chloride-type resins such as polyvinyl chloride and copolymers of vinyl chloride, epoxy resins, amorphous polyolefins, polyesters and metals such as aluminum. If necessary, these materials may be used in combination.

Among the materials listed above, amorphous polyolefins and polycarbonate are more preferable from the standpoints of moisture resistance, dimension stability and low cost. Polycarbonate is particularly preferable. The thickness of the substrate is preferably 1.1±0.3 mm.

A guide groove for tracking or a pre-groove representing information such as address signals is formed on the substrate. In order to achieve higher storage density, it is preferable to use a substrate having a pre-groove with a track pitch that is narrower than the track pitch in a conventional CD-R or DVD-R. It is essential that the track pitch of the pre-groove is 200 to 400 nm, and preferably 280 to 340 nm. It is also essential that the depth of the pre-groove (groove depth) is 20 to 150 nm, and preferably 30 to 80 nm.

An undercoat layer is preferably disposed on the surface of the substrate at the side disposed with the light-reflective layer, in order to improve surface smoothness and enhance adhesion.

Examples of material for the undercoat layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate and the like; and surface-modifying agents such as silane coupling agents.

The undercoat layer can be formed by preparing a coating liquid by dissolving or dispersing the above-mentioned material in a suitable solvent, and applying the coating liquid to the substrate surface by spin coating, dip coating, extrusion coating, or the like. The thickness of the undercoat layer is normally 0.005 to 20 µm, and preferably 0.01 to 10 µm.

Light-Reflective Layer

In the invention, the surface of the light-reflective layer at a side thereof at which the recording layer is disposed is characterized in that it has a ten-point average roughness Rz of 70 nm or less, a central surface average roughness SRa of 30 nm or less and an average projection diameter Dv, at a height of 15 nm, of 75 nm or less.

If the ten-point average roughness Rz is 70 nm or less, the central surface average roughness SRa is 30 nm or less and the average projection diameter Dv at a height of 15 nm is 75 nm or less, then a decrease in reflectance, an increase in noise, and a deterioration in jitter can be prevented.

The above-mentioned ten-point average roughness Rz is preferably 0.5 to 70 nm, and more preferably 0.5 to 50 nm.

Further, the central surface average roughness SRa is preferably 20 nm or less, and more preferably 10 nm or less.

The average projection diameter Dv at a height of 15 nm is preferably 50 nm or less.

In the invention, the ten-point average roughness Rz and central surface average roughness SRa are values when the measurement is conducted over a 10 µm$^2$ area using an AFM (atomic force microscope).

The light-reflective layer can be formed by, for example, vacuum-depositing, sputtering or ion-plating the light-reflective material described later on the substrate. When sputtering is employed, it is possible to control the ten-point average roughness Rz, the central surface average roughness SRa and the average projection diameter Dv at a height of 15 nm. Namely, the ten-point average roughness Rz, the central surface average roughness SRa and the average projection diameter Dv at a height of 15 nm can be controlled by controlling the thickness of the reflective layer, a sputtering power and an argon flow rate when sputtering the light-reflective material.

The thickness of the light-reflective layer is preferably 10 to 300 nm, and more preferably 60 to 150 nm.

When the thickness of the light-reflective layer is less than 10 nm, a decrease in the reflectance may sometimes occur. On the other hand, when the thickness of the light-reflective layer is over 300 nm, segregation occurs at a part of the surface of the light-reflective layer to occasionally render the surface of the light-reflective layer rougher and the diameter of a protruded matter larger.

The sputtering power in sputtering the light-reflective material is preferably 0.1 to 10 kw, more preferably 0.2 to 7 kw, and still more preferably 1.5 to 7 kw.

When the sputtering power is over 10 kw, the surface of the reflective layer may roughen, occasionally making the diameter of a protruded matter larger.

The argon flow rate for sputtering the light-reflective material is preferably $1.67 \times 10^{-3}$ to 1.67 cm$^3$/sec (0.1 to 100 sccm), more preferably $3.3 \times 10^{-3}$ to 0.33 cm$^3$/sec (0.2 to 20 sccm), and still more preferably 0.05 to 0.33 cm$^3$/sec (3 to 20 sccm).

When the argon flow rate is over 1.67 cm$^3$/sec, segregation occurs at a part of the surface of the reflective layer, whereby the surface of the light-reflective layer may roughen, occasionally making the diameter of a protruded matter larger.

The duration of time for forming a film is not particularly restricted, but preferably 0.5 to 5 seconds.

Any material having a reflectance over 70% with respect to lasers may be used for the light-reflective layer.

Examples of the light-reflective material having the reflectance over 70% with respect to lasers include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. These light-reflective materials may be used singly or in combination of two or more, or alternatively as alloys. Among these materials, Au, Ag, and their alloys are preferable. Au, Ag, and the alloys containing Au and Ag as the main component are particularly preferable.

Recording Layer

The recording layer is formed on the light-reflective layer and contains a dye as a recording material. Information can be recorded on the recording layer by a laser beam having a wavelength of 450 nm or less. Examples of the dye contained in the recording layer include cyanine dyes, oxonol dyes, metal complex-based dyes, azo dyes and phthalocyanine dyes, among which phthalocyanine dyes are preferable.

The dye contained in the recording layer preferably has a maximum absorption wavelength of 400 nm or less. If the dye has the maximum absorption wavelength over 400 nm, effective recording and reproduction of information may be impaired when using a laser beam having a wavelength of 400 nm or more.

In addition, the dyes described in JP-A Nos. 4-74690, 8-127174, 11-53758, 11-334204, 11-334205, 11-334206, 11-334207, 2000-43423, 2000-108513 and 2000-158818 can also be suitably used.

The recording layer is formed by preparing a coating liquid by dissolving a recording material such as a dye together with a binder and the like in a suitable solvent, and applying the coating liquid to the light-reflective layer formed on the substrate surface to form a layer, followed by drying the layer. The concentration of the recording material in the coating liquid is normally 0.01 to 15% by mass, preferably 0.1 to 10% by mass, more preferably 0.5 to 5% by mass, and most preferably 0.5 to 3% by mass.

Examples of the solvent for preparing the dye coating liquid include esters such as butyl acetate, ethyl lactate and cellosolve acetate; ketones such as methyl ethyl ketone, cyclohexanone and methyl isobutyl ketone; chlorinated hydrocarbons such as dichloroethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol and n-butanol diacetone alcohol; fluorine-based solvents such as 2,2,3,3-tetrafluoropropanol; glycol ethers such as ethylene glycol monomethyl ether, ethylene glycol monoethyl ether and propylene glycol monomethyl ether.

These solvents may be used singly or in combination of two or more by taking into consideration of the solubility of the recording material to be used. The dye coating liquid may also contain additives such as an antioxidant, a UV absorber, a plasticizer and a lubricant depending on the use purposes.

If a binder is used, examples of the binder include naturally occurring organic polymeric substances such as gelatin, cellulose derivatives, dextran, rosin, and rubber; and synthetic organic polymers, for example, hydrocarbon-based resins such as polyethylene, polypropylene, polystyrene and polyisobutylene; vinyl-type resins such as polyvinyl chloride, polyvinylidene chloride and vinyl chloride/polyvinyl acetate copolymers; acrylic resins such as polymethyl acrylate and polymethyl methacrylate; polyvinyl alcohol, chlorinated polyethylene, epoxy resins, butyral resins, rubber derivatives, and pre-condensates of heat-curable resins, e.g., phenol/formaldehyde resins. If the binder is used together with the recording material in the recording layer, the amount of the binder is generally 0.01 to 50 times (by mass ratio), and preferably 0.1 to 5 times (by mass ratio), relative to the recording material. The concentration of the recording material in the coating liquid thus prepared is generally 0.01 to 10% by mass, and preferably 0.1 to 5% by mass.

The dye solution may be coated by spraying, spin coating, dip coating, roll coating, blade coating, doctor roll coating, or screen printing.

The recording layer may comprise a single layer or several layers. The thickness of the recording layer is usually 20 to 500 nm, preferably 30 to 300 nm, and more preferably 50 to 100 nm.

In order to raise the lightfastness of the recording layer, various kinds of anti-fading agents may be incorporated in the recording layer.

Generally, a singlet oxygen quencher is used as the anti-fading agent. Singlet oxygen quenchers already described in publications such as patent specifications can be used.

Specific examples of the singlet oxygen quencher include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Application Publication (JP-B) Nos. 1-38680 and 6-26028, German Patent No. 350399, and *Journal of the Chemical Society of Japan,* October 1992, p. 1141.

The amount of the anti-fading agent such as the singlet oxygen quencher is usually 0.1 to 50% by mass, preferably 0.5 to 45% by mass, more preferably 3 to 40% by mass, and particularly preferably 5 to 25% by mass, relative to the amount of the dye used.

Bonding Layer

The bonding layer is formed in order to raise adhesion between the recording layer and a cover layer described later. As the adhesive for forming the bonding layer, a UV-curable resin or a sticker is preferable. The thickness of the bonding layer is preferably 1 to 1000 µm, more preferably 5 to 500 µm, and particularly preferably 10 to 100 µm in order to impart elasticity to the bonding layer.

The UV-curable resin for use as the adhesive in the invention may be a conventionally used UV-curable resin.

The sticker for use as the adhesive in the invention refers to an adhesive capable of instantaneous adhesion with a very slight pressure, as normally applied on the rear surface of an adhesive double coated tape, label and the like.

When a UV-curable resin is used as the adhesive, the UV-curable resin itself is applied on a recording layer, or alternatively the resin is dissolved in a suitable solvent such as methyl ethyl ketone and ethyl acetate to prepare a coating liquid and applied on the recording layer to form a cover layer, followed by UV irradiation over the cover layer to harden the adhesive, to thereby form the bonding layer.

In order to prevent warping of the disk, the conventional UV-curable resin for constituting the bonding layer may be used. UV-curable resins having a smaller coefficient of contraction are preferable. As the UV-curable resin, for example, SD-640 manufactured by Dainippon Ink & Chemicals, Inc. can be used. SD-347, SD-694 (both manufactured by Dainippon Ink & Chemicals, Inc.) and SKCD1051 (manufactured by SKC Co., Ltd.) can also be used.

When a sticker is used as the adhesive, the sticker in the form of a tape is adjusted to have a suitable size, affixed to the recording layer, followed by peeling off a separator and subsequent formation of the cover layer.

If an adhesive double coated tape is used as the sticker, any substrate may be used without any restriction for the adhesive double coated tape. Examples of the substrate include plastic films such as polyethylene terephthalate, polypropylene, polyethylene and vinyl chloride, papers such as craft paper, high quality paper, precoat paper and Japanese paper, non-woven fabrics such as rayon and polyester, woven fabrics made of synthetic fibers such as polyester, nylon and acryl, foils of metals such as aluminum, copper and stainless steel. Plastic films are preferable from the standpoint of uniformly coating a releasing agent in a striped pattern on the substrate.

Conventionally used releasing agents such as a silicone-based releaser and a long chain alkyl-based releaser can be arbitrarily selected and used as the releasing agent for the adhesive double coated tape.

Any adhesive that contributes adhesion is used without any restriction. Acrylic stickers as well as rubber-based stickers such as natural rubber, styrene-isoprene-styrene copolymer (SIS) and styrene-butadiene-styrene copolymer (SBS) can be suitably selected and used in the invention.

Cover Layer

The cover layer is formed in the invention to prevent water from penetrating into the interior of the optical information recording medium, and preferably made of a material having a transmittance of 80% or more for a laser beam for recording and reproducing (playback) information. Specifically, polycarbonate (Pure Ace manufactured by Teijin Ltd., Pan Light manufactured by Teijin Chemicals Ltd.), cellulose triacetate (Fuji Tack manufactured by Fuji Photo Film Co., Ltd.) and PET (Lumilar manufactured by Toray Corp.) are preferable, among which polycarbonate and cellulose triacetate are more preferable.

The cover layer is formed by preparing a coating liquid by dissolving a photo-curable resin for forming the bonding layer in a suitable solvent, applying the coating liquid to the recording layer at a predetermined temperature to form a coating layer, laminating thereon a cellulose triacetate film (TAC film) obtained by, e.g., extrusion of plastic to the coating layer, followed by irradiating the resulting laminate with light from the laminated TAC film side to thereby cure the coating layer. The above-mentioned TAC film preferably contains a UV absorber. The thickness of the cover layer in the invention is 0.01 to 0.5 mm, and preferably 0.05 to 0.2 mm.

In order to control viscosity, the temperature at which coating is conduced is preferably 23 to 50° C., more preferably 24 to 40° C., and most preferably 25 to 37° C.

In order to prevent the disk from warping, it is preferable that a pulse-type light irradiator (preferably a UV irradiator) is used to irradiate the coating layer with ultraviolet light. The pulse interval is preferably msec or less, and more preferably psec or less. Although the amount of light irradiated per pulse is not particularly limited, it is preferably 3 kW/cm$^2$ or less, and more preferably 2 kW/cm$^2$ or less.

Although the number of irradiation times is not particularly limited, it is preferably 20 or less, and more preferably 10 or less.

Methods of Recording and Reproducing Information Using an Optical Information Recording Medium of the Invention Next, a method of recording information on the optical information recording medium of the invention and a method of reproducing information from the medium are described.

Information is recorded on the optical information recording medium, for example, as follows.

First, an optical information recording medium is irradiated with a laser beam for recording information from the side at which the cover layer is disposed while rotating the medium at a constant linear speed or a constant angular velocity. By this irradiation, the recording layer absorbs the laser light and the temperature rises locally at the irradiated portion. The rise in temperature causes a physical or chemical change (e.g., formation of pits) to alter the optical properties of the irradiated portion, whereby information is recorded.

As the laser light source having an oscillating wavelength of 450 nm or less (preferably, 380 to 434 nm), for example, a blue-violet semiconductor laser having an oscillating wavelength of 400 to 410 nm, a blue-green semiconductor laser having a central oscillating wavelength of 405 nm, and the like are listed. In order to increase recording density, it is particularly preferable to use a blue-violet semiconductor laser capable of emitting a laser beam of a shorter wavelength. Further, in order to increase recording density, an NA of an objective lens used for pick-up is preferably 0.7 or more, and more preferably 0.85 or more.

The recorded information can be reproduced by irradiating the optical information recording medium with a laser beam from the side at which the cover layer is disposed by rotating the medium at the same constant linear speed as described above to detect a reflected light.

Illustrated above are the examples of the optical information recording medium including the recording layer incorporating an organic compound such as a dye as the recording material, however, the recording layer may be a phase transition recording layer to perform recording by phase transition, or a photo-magnetic recording layer to perform recording by photo-magnetism. For example, if the phase transition recording layer is used, a dielectric layer that is made of $ZnS$—$SiO_2$ or the like is disposed, instead of a light transmissive layer. In the phase transition recording layer, metal compounds such as Sb, Te, Ag, In and chalcogenides may be used as the recording material.

EXAMPLES

The present invention is explained in more detail by way of examples given below. It should be noted that the invention is not limited to the following examples.

Example 1

The grooved side of a spirally grooved substrate made of polycarbonate (manufactured by Teijin Ltd., trade name: Pan Light AD5503), which was obtained by injection molding and which had a thickness of 1.1 mm and a diameter of 120 mm and had groove depth of 100 nm, width of 0.120 $\mu$m and track pitch of 300 nm, was sputtered with Ag under the conditions of a sputtering power of 0.2 kw and an argon flow rate of 0.3 $cm^3$/sec to form a light-reflective layer having a layer thickness of 100 nm.

Next, ORAZOL BLUE GN (manufactured by Ciba Specialty Chemical Inc.) as a dye was dissolved in 2,2,3,3-tetrafluoropropanol by carrying out an ultrasonic treatment for 2 hours to thereby obtain a dye coating liquid. The dye coating liquid thus prepared was spin-coated on the reflective layer by varying rotational frequency from 300 rpm to 4000 rpm at 23° C. and 50% RH. Then, the coating layer was kept at 23° C. and 50% RH for 2 hours. Thereafter, a UV-curable adhesive (SD-347 manufactured by Dainippon Ink & Chemicals Inc., an amount of the dissolved dye: 0.05% by mass) was spin-coated at a rotational frequency of 100 to 300 rpm, and the resultant layer was overlaid with a cellulose triacetate (FUJITACK, manufactured by Fuji Photo Film Co., Ltd., thickness: 80 $\mu$m) sheet as a cover layer. The adhesive was then spread over the entire surface by varying rotational frequency from 300 rpm to 4000 rpm. Thereafter, the bonding layer was cure by irradiation with ultraviolet light using a UV lamp, to thus produce a sample (optical information recording medium).

Example 2

An optical information recording medium was produced in the same manner as in Example 1 except that Ag was changed to Al and Al sputtering was conducted under the conditions of a sputtering power of 3.0 kw and an argon flow rate of 3 $cm^3$/sec to form the light-reflective layer having a layer thickness of 80 nm.

Example 3

An optical information recording medium was produced in the same manner as in Example 1 except that Ag sputtering was conducted under the conditions of a sputtering power of 8.5 kw and an argon flow rate of 47 $cm^3$/sec to form the light-reflective layer having a layer thickness of 180 nm.

Comparative Example 1

An optical information recording medium was produced in the same manner as in Example 1 except that Ag was sputtered under the conditions of a sputtering power of 0.2 kw and an argon flow rate of 0.3 $cm^3$/sec to form the light-reflective layer having a layer thickness of 300 nm.

Comparative Example 2

An optical information recording medium was produced in the same manner as in Example 1 except that Ag was sputtered under the conditions of a sputtering power of 13.5 kw and an argon flow rate of 0.3 $cm^3$/sec to form the light-reflective layer having a layer thickness of 230 nm.

Comparative Example 3

An optical information recording medium was produced in the same manner as in Example 1 except that Ag was sputtered under the conditions of a sputtering power of 35 kw and an argon flow rate of 0.3 $cm^3$/sec to form the light-reflective layer having a layer thickness of 100 nm.

Comparative Example 4

An optical information recording medium was produced in the same manner as in Example 1 except that Ag was sputtered under the conditions of a sputtering power of 0.2 kw and an argon flow rate of 65 $cm^3$/sec to form the light-reflective layer having a layer thickness of 100 nm.

Evaluation

The thus produced optical information recording media were evaluated for the following properties. The results are shown in Table 1.

Evaluation of Noise

The produced optical information recording media were assessed using an apparatus for evaluating recorded and reproduced information (DDU1000 manufactured by Pulsetech Corp.) equipped with a 405 nm laser and an NA 0.85 pick-up. The apparatus measures the reflectance at a non-recorded portion using an oscilloscope at a clock frequency of 66 MHz/(linear speed: 5.6 m/s), and an "amplitude of signal/size of signal" is defined as a noise. It is preferable that the optical information recording media have a noise of 10% or less.

Evaluation of Jitter

The produced optical information recording media were assessed using an apparatus (DDU1000 manufactured by Pulsetech Corp.) equipped with a 405 nm laser and an NA 0.85 pick-up. 1–7PP modulating signals were recorded and reproduced so as to measure jitter using a time interval analyzer at a clock frequency of 66 MHz/(linear speed: 5.6 m/s). It is preferable that the optical information recording media have a jitter of 10% or less.

Measurements of Ten-Point Average Roughness Rz, Central Surface Average Roughness SRa, Average Projection Diameter Dv at a Height of 15 nm After measurements of noise and jitter, the cover layer was peeled off from the samples (optical information recording media) and the recording layer was removed using an alcohol-based solvent. Immediately after the removal, an AFM measurement was conducted under the following conditions to determine the ten-point average roughness Rz, the central surface average roughness SRa and the average projection diameter Dv at a height of 15 nm.

<AFM Measurement Conditions>
Apparatus: SPA500 (manufactured by Seiko Instruments Inc.)
Mode: AFM mode (contact mode)
Measuring probe: SI AF01 (spring constant: 0.1 N/m)
Scanning range: 10 μm² area
Scanning line: 512×512
Scanning speed: 2 Hz

TABLE 1

| | Ten-point Average Roughness Rz (nm) | Central Surface Average Roughness SRa (nm) | Average Projection Diameter Dv at a Height of 15 nm (nm) | Jitter (%) | Noise (%) |
|---|---|---|---|---|---|
| Example 1 | 1.2 | 0.6 | 0 | 8.2 | 5.3 |
| Example 2 | 29.0 | 4.6 | 31 | 8.0 | 5.9 |
| Example 3 | 63.7 | 22.0 | 73 | 8.4 | 9.4 |
| Comparative Example 1 | 80.6 | 31.3 | 80 | 10.1 | 11.3 |
| Comparative Example 2 | 112.1 | 39.7 | 64 | 9.0 | 13.8 |
| Comparative Example 3 | 27.8 | 3.1 | 161 | 11.5 | 23.0 |
| Comparative Example 4 | 79.3 | 30.0 | 130 | 11.3 | 17.5 |

Table 1 shows that in Examples 1 to 3 in which the ten-point average roughness Rz, the central surface average roughness SRa and the average projection diameter Dv at a height of 15 nm were all within specific ranges of the invention, the optical information recording media exhibited decreased noise and lowered jitter, and thus were revealed to be excellent and highly reliabile.

On the other hand, in Comparative Examples 1 and 4 in which the ten-point average roughness Rz was 70 nm or more and the average projection diameter Dv at a height of 15 nm was 75 nm or more, noise was large and jitter was high.

In Comparative Example 2 in which the ten-point average roughness Rz was 70 nm or more, noise was large.

In Comparative Example 3 in which the average projection diameter Dv at a height of 15 nm was 75 nm or more, noise was large and jitter was high.

Illustrated below are the reference examples of optical information recording media in which the light-reflective layer was formed by employing preferable sputtering conditions.

(Reference Examples 1 to 18)

Grooved sides of spirally grooved substrates made of polycarbonate (manufactured by Teijin Ltd., trade name: Pan Light AD5503), which were obtained by injection molding and which had a thickness of 1.1 mm and a diameter of 120 mm and had groove depth of 40 nm, width of 150 nm and track pitch of 320 nm, were sputtered with each of light-reflective materials under the respective conditions shown in Table 2 to form the light-reflective layer. Next, an organic substance represented by the following structural formula was dissolved in methyl lactate to give a 3% solution by carrying out an ultrasonic treatment for 2 hours to thereby obtain a dye coating liquid. The dye coating liquid thus prepared was spin-coated by varying rotational frequency from 300 rpm to 4000 rpm at 23° C. and 50% RH. Then, annealing was conducted at 23° C. and 50% RH for 2 hours. Thereafter, ZnS—SiO₂ was formed in 50 nm thick by sputtering, and a UV-curable adhesive (SD-661 manufactured by Dainippon Ink & Chemicals Inc.) was spin-coated at a rotational frequency of 100 to 300 rpm. Thereafter, the resultant layer was overlaid with a polycarbonate (Pure Ace, manufactured by Teijin Ltd., layer thickness: 80 μm) sheet as a cover layer. The UV-curable adhesive was then spread over the entire surface by varying rotational frequency from 300 rpm to 4000 rpm and cured by irradiation with ultraviolet light using a UV lamp, to thus produce samples (optical information recording media) of Reference Examples 1 to 18.

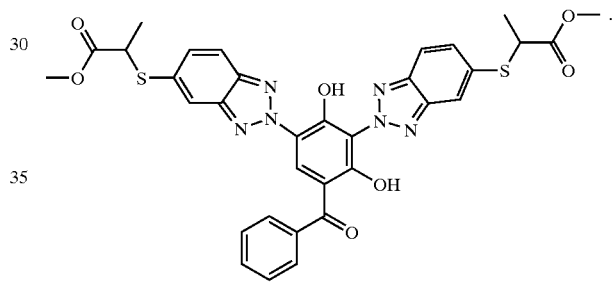

(Reference Examples 19 to 21)

Grooved sides of spirally grooved substrates made of polycarbonate (manufactured by Teijin Ltd., trade name: Pan Light AD5503), which were obtained by injection molding and which had a thickness of 1.1 mm and a diameter of 120 mm and had groove depth of 40 nm, width of 150 nm and track pitch of 340 nm, were sputtered with each of light-reflective materials under the respective conditions shown in Table 2 to form the light-reflective layer having a layer thickness of 120 nm. Next, ORASOL BLUE GN (manufactured by Chiba Specialty Chemical Corp.) was dissolved in 2,2,3,3-tetrafluoropropanol to give a 3% solution by carrying out an ultrasonic treatment for 2 hours to thereby obtain a dye coating liquid. The dye coating liquid thus prepared was spin-coated by varying rotational frequency from 300 rpm to 4000 rpm at 23° C. and 50% RH. Then, SiO₂ was formed in 50 nm thick by sputtering, and a UV-curable adhesive (SD-661 manufactured by Dainippon Ink & Chemicals Inc.) was spin-coated at a rotational frequency of 100 to 300 rpm. Thereafter, the resultant layer was overlaid with a polycarbonate (PURE ACE, manufactured by Teijin Ltd., layer thickness: 80 μm) sheet as a cover layer. The UV-curable adhesive was then spread over the entire surface by varying rotational frequency from 300 rpm to 4000 rpm and cured by irradiation with ultraviolet light using a UV lamp, to thus produce samples (optical information recording media) of Reference Examples 19 to 21.

The thus produced optical information recording media of Reference Examples 1 to 21 were measured for the width of non-recorded RF signals and non-recorded reflectances using DDU-1000 (manufactured by Pulsetech Corp.) equipped with a 405 nm laser and an NA 0.85 pick-up. Non-recorded noise was calculated by dividing the obtained width of the RF signal by the obtained non-recorded reflectance. The results are shown in Table 2 below.

TABLE 2

| | Light-Reflective Material | Ar Flow Rate (cm³/sec) | Sputtering Power (kW) | Layer Forming Duration (sec) | Non-recorded Noise (%) |
|---|---|---|---|---|---|
| Reference Example 1 | Ag | 0.033 | 2 | 4.4 | 30 |
| Reference Example 2 | AgPdCu | 0.12 | 5 | 1.6 | 4 |
| Reference Example 3 | AgAuGe | 0.12 | 5 | 1.6 | 5 |
| Reference Example 4 | Ag | 0.12 | 5 | 1.6 | 5 |
| Reference Example 5 | Ag | 0.083 | 2 | 4.4 | 8 |
| Reference Example 6 | Ag | 0.05 | 2 | 4.4 | 10 |
| Reference Example 7 | Ag | 0.33 | 2 | 4.4 | 15 |
| Reference Example 8 | Ag | 0.37 | 2 | 4.4 | 20 |
| Reference Example 9 | Ag | 0.12 | 1 | 5.5 | 30 |
| Reference Example 10 | Ag | 0.12 | 1.5 | 5.0 | 15 |
| Reference Example 11 | Ag | 0.12 | 2 | 4.4 | 7 |
| Reference Example 12 | Ag | 0.12 | 7 | 1.2 | 10 |
| Reference Example 13 | Ag | 0.12 | 8 | 0.8 | 20 |
| Reference Example 14 | Ag | 0.12 | 5 | 0.4 | 20 |
| Reference Example 15 | Ag | 0.12 | 5 | 0.5 | 15 |
| Reference Example 16 | Ag | 0.12 | 5 | 3.0 | 7 |
| Reference Example 17 | Ag | 0.12 | 5 | 5.0 | 10 |
| Reference Example 18 | Ag | 0.12 | 5 | 6.0 | 20 |
| Reference Example 19 | Ag | 0.12 | 5 | 1.6 | 5 |
| Reference Example 20 | AgPdCu | 0.12 | 5 | 1.6 | 4 |
| Reference Example 21 | AgAuGe | 0.12 | 5 | 1.6 | 5 |

AgPdCu: manufactured by Furuya Metal Co., Ltd.
AgAuGe: manufactured by Ishifuku Kinzoku Kogyo K. K.

As described above, according to the invention, there is provided an optical information recording medium that is excellent in jitter, noise and the like and has high reliability.

What is claimed is:

1. An optical information recording medium comprising a substrate including a groove that has a track pitch of 200 to 400 nm and a depth of 20 to 150 nm, the substrate having successively disposed thereon a light-reflective layer, a recording layer on which information is recordable by a laser beam having a wavelength of 450 nm or less, an adhesive layer containing an adhesive, and a cover layer having a thickness of 0.01 to 0.5 mm, wherein a surface of the light-reflective layer at a side thereof at which the recording layer is disposed has a ten-point average roughness Rz of 70 nm or less, a central surface average roughness SRa of 30 nm or less, and an average projection diameter Dv, at a height of 15 nm from a reference plane, of 75 nm or less.

2. The optical information recording medium according to claim 1, wherein a material for the substrate is selected from the group consisting of glass, polycarbonate, polymethyl methacrylate, amorphous polyolefins, vinyl chloride-type resins, epoxy resins, polyesters and metals.

3. The optical information recording medium according to claim 2, wherein the substrate has a thickness of 1.1±0.3 mm.

4. The optical information recording medium according to claim 1, wherein the light-reflective layer contains a light-reflective material selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi.

5. The optical information recording medium according to claim 4, wherein the light-reflective layer has a thickness of 10 to 300 nm.

6. The optical information recording medium according to claim 1, wherein the recording layer contains a dye selected from the group consisting of cyanine dyes, oxonol dyes, metal complex-based dyes, azo dyes and phthalocyanine dyes.

7. The optical information recording medium according to claim 6, wherein the recording layer has a thickness of 20 to 500 nm.

8. The optical information recording medium according to claim 1, wherein the adhesive layer has a thickness of 1 to 1000 $\mu$m.

9. The optical information recording medium according to claim 1, wherein the cover layer has a thickness of 0.05 to 0.2 mm.

10. The optical information recording medium according to claim 1, wherein the groove has a track pitch of 280 to 340 nm.

11. The optical information recording medium according to claim 1, wherein the groove has a depth of 30 to 80 nm.

12. The optical information recording medium according to claim 1, wherein an undercoat layer is formed on a surface of the substrate at a side thereof at which the light-reflective layer is disposed.

13. The optical information recording medium according to claim 12, wherein the undercoat layer has a thickness of 0.005 to 20 $\mu$m.

14. The optical information recording medium according to claim 1, wherein the ten-point average roughness Rz is 0.5 to 50 nm.

15. The optical information recording medium according to claim 1, wherein the central surface average roughness SRa is 20 nm or less.

16. The optical information recording medium according to claim 1, wherein the average projection diameter Dv, at a height of 15 nm from a reference plane, is 50 nm or less.

17. The optical information recording medium according to claim 4, wherein the light-reflective layer is formed on the substrate by sputtering a light-reflective material using a sputtering power of 0.1 to 10 kw.

18. The optical information recording medium according to claim 17, wherein an argon flow rate for sputtering the light-reflective material is $1.67 \times 10^{-3}$ to 1.67 cm³/sec (0.1 to 100 sccm).

19. The optical information recording medium according to claim 17, wherein an argon flow rate for sputtering the light-reflective material is $3.3 \times 10^{-3}$ to 0.33 cm³/sec (0.2 to 20 sccm).

20. The optical information recording medium according to claim 17, wherein an argon flow rate for sputtering the light-reflective material is 0.05 to 0.33 cm³/sec (3 to 20 sccm).

* * * * *